United States Patent [19]

Ehrlich

[11] 4,035,761

[45] July 12, 1977

[54] SONAR TRANSDUCER HAVING INERTIAL INDUCTOR

[75] Inventor: Stanley L. Ehrlich, Middletown, R.I.

[73] Assignee: Raytheon Company, Lexington, Mass.

[21] Appl. No.: 624,198

[22] Filed: Oct. 20, 1975

[51] Int. Cl.² .......................................... H04B 13/00

[52] U.S. Cl. .................................. 340/10; 310/8.2; 340/8 R

[58] Field of Search ............ 310/8.2, 8.4; 340/8 R, 340/8 MM, 9, 10, 11, 12 R, 13 R, 14

[56] References Cited

U.S. PATENT DOCUMENTS

| | | | |
|---|---|---|---|
| 2,963,681 | 12/1960 | Morgan | 340/8 R |
| 3,185,869 | 5/1965 | Shoor | 310/8.4 |
| 3,283,590 | 11/1966 | Shang | 310/8.4 X |
| 3,374,663 | 3/1968 | Morris | 310/8.4 |
| 3,389,276 | 6/1968 | Gradin et al. | 310/8.4 |
| 3,427,481 | 2/1969 | Lenahan et al. | 340/10 X |
| 3,460,061 | 8/1969 | Massa | 340/10 X |
| 3,716,828 | 2/1973 | Massa | 340/10 |
| 3,769,532 | 10/1973 | Tocquet | 340/10 |
| 3,794,866 | 2/1974 | McElroy | 340/8 MM |

*Primary Examiner*—Harold Tudor
*Attorney, Agent, or Firm*—David M. Warren; Joseph D. Pannone; Milton D. Bartlett

[57] ABSTRACT

A transducer assembly in which a transducer unit of a piezoelectric material which is rigidly held between a rear member and a front member, both of which are made to vibrate upon energizing the piezoelectric material. Inductive elements comprising copper conductors wound about iron cores and utilized in the tuning of the transducer assembly are rigidly connected to one or both of the members and may also be connected to the transducer unit itself to serve as a portion of the inertial mass which imparts a mechanical vibrational characteristic to the transducer assembly. In one embodiment of the invention, the rear member is provided with a void wherein there is nested an inductor having an inertia similar to that of the material removed from the rear member in forming the void.

4 Claims, 1 Drawing Figure

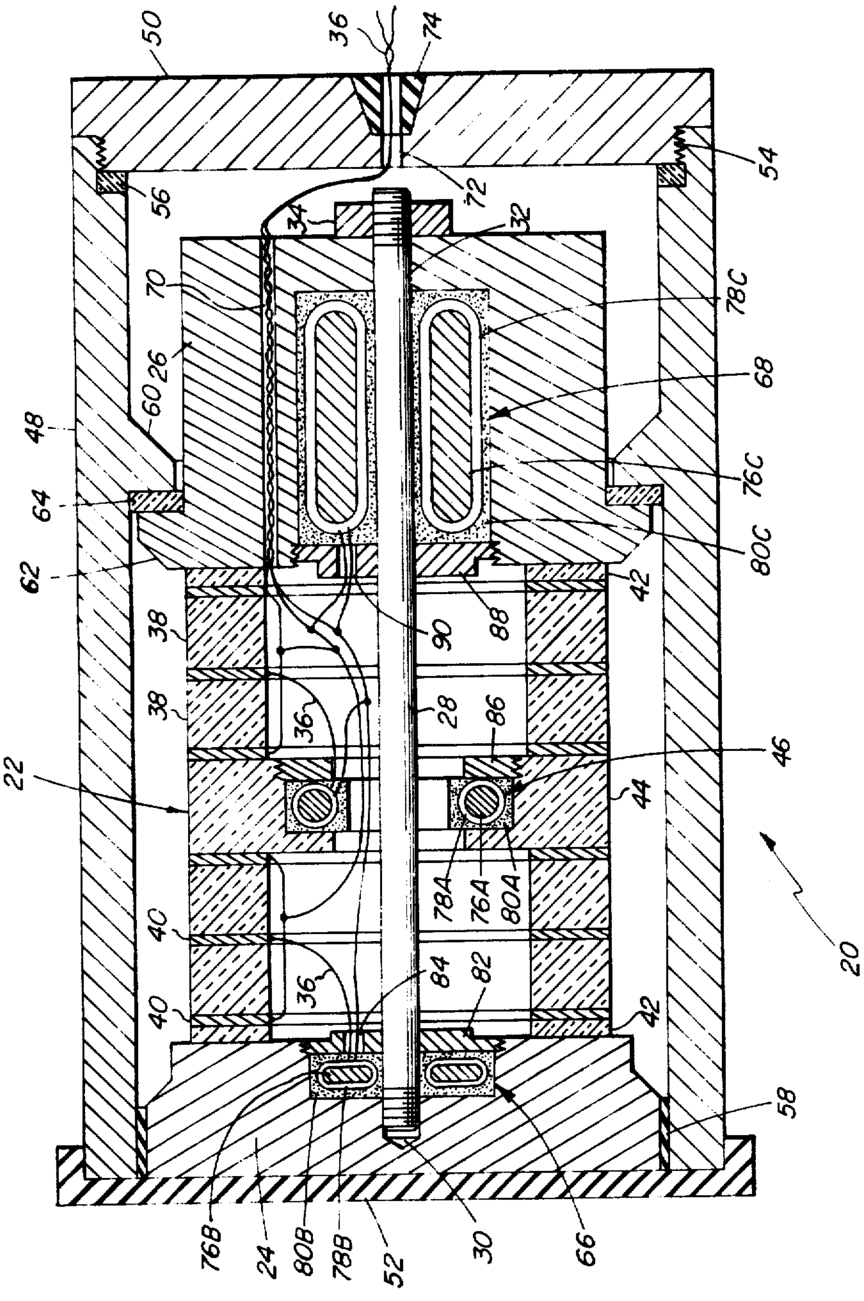
50
36
74
54
56
72
34
32
70
78C
26
68
60
48
76C
64
80C
62
42
38
90
88
38
36
28
86
22
46
44
78A
76A
80A
40
84
82
36
40
42
58
76B
24
80B
78B
52
30
66
20

SONAR TRANSDUCER HAVING INERTIAL INDUCTOR

BACKGROUND OF THE INVENTION

Transducer units are frequently fabricated from one or more piezoelectric ceramic elements having metallic electrodes bonded thereto. Th resulting structure has electrical capacity which is commonly turned by an external inductor to provide the desired electrical resonance characteristic to the transducer assembly. The combination of the mechanical vibrational characteristics and the electrical resonance provide the overall frequency band-pass characteristic in converting sonic energy incident upon the transducer assembly to electrical energy, as well as in converting electrical energy into acoustic energy.

A problem arises in that the mechanical portions of the transducer assembly must be sufficiently large to impart the desired mechanical vibrational characteristic to the transducer assembly. In addition, the inductive element utilized in tuning the capacitance of the transducer assembly is often comparable in magnitude to the physical size of a mechanical component of the transducer assembly such as a rear member or the ceramic transducer unit. Thus, the transducer assembly with the inductive tuning element has greater size and weight than may be necessary.

SUMMARY OF THE INVENTION

The aforementioned problem is overcome and other advantages are provided by a transducer assembly which, in a preferred embodiment of the invention, comprises a transducer unit rigidly held between a front member and a rear member both of which have sufficient mass to provide a desired mechanical vibrational characteristic to the transducer assembly. The transducer unit is preferably fabricated of a piezoelectric ceramic material which typically takes the form of one or more rings with metallic electrodes attached thereto for coupling electrical energy to and from the transducer unit. The front and rear members are urged together by means of a tie rod positioned along the axis of the transducer assembly.

In accordance with the invention, an inductor having inductance for tuning out the capacitance of the transducer unit is attached rigidly to one or both of the front and rear members and may also be attached to the transducer unit itself. The inductor comprises copper windings about an iron core and, accordingly, has a mass density approximately the same as the iron commonly utilized in fabricating the front and rear members. In a preferred embodiment of the invention, the rear member is provided with a void into which is nested a toroidal inductor. Thus, the inductor serves as both an electrical tuning element and a portion of the mechanical inertia utilized in mechanically tuning the transducer assembly. The axis of the toroid is concentric with the axis of the tie rod, the toroidal form of inductor having been utilized to provide a magnetic path for the inductor which is substantially invariant with respect to the presence of the material of the tie rod; this prevents the tie rod from detuning the circuit of the inductor with the capacitance of the transducer unit.

BRIEF DESCRIPTION OF THE DRAWING

The aforementioned aspects and other features of the invention are explained in the following description taken in connection with the accompanying drawing wherein the FIGURE is a sectional view of a transducer assembly showing an inductor utilized as an inertial element in accordance with the invention.

DESCRIPTION OF THE PREFERRED EMBODIMENT

Referring to the figure, there is seen a transducer assembly 20 which comprises a transducer unit 22 rigidly held between a 30 front member 24 and a rear member 26 by a rod 28 which is threadedly secured in the front member 24 in a threaded bore 30 and passes through a central bore 32 of the rear member 26 to be secured thereto by a nut 34. The front and rear members 24 and 26 serve as inertial members having sufficient mass to mechanically resonate with the transducer unit 22. The rod 28 urges the front member 24 towards the rear member 26 and thereby places a compressive stress upon the transducer unit 22 to insure that the transducer unit 22 operates under a condition of compressive stress when made to vibrate by electrical signals imparted thereto by wires 36 or by sonic energy incident upon the front member 24.

The transducer unit 22 is seen to be comprised of transducer elements 38 each of which has the form of a ring and has metallic electrodes 40 bonded thereto for applying an electrical field across the elements 38 in response to electrical signals coupled to the electrodes 40 by the wires 36. Insulators 42 having the forms of rings are placed between the electrodes 40 at the ends of the transducer unit 22 and the front member 24 and the rear member 26 to electrically insulate the transducer unit 22 from the electricaly conductive metal, such as iron, of which the front member 24 and the rear member 26 are fabricated. A ceramic element 44 having the shape of a ring is positioned at the middle of the transducer unit 22 for supporting an inductor 46 as will be described hereinafter.

The front and rear members 24 and 26 and the transducer unit 22 are enclosed by a cylindrical case 48 which is enclosed at the rear by a cap 50 and at the front by a rubber boot 52. The cap 50 is secured to the case 48 by threads 54 and a sealing ring 56 of a compressible waterproof material such as rubber which is compressed by the cap 50 against the case 48 to exclude the entry of water into the interior of the case 48. The boot 52 is secured by an adhesive to the case 48 and to the front face of the front member 24 to preclude the entry of water into the interior of the case 48. A rubber ring 58 is adhesively secured between the case 48 and the side of the front member 24 for resiliently positioning the front member 24 along the axis of the case 48. The case is also provided with an inner flange 60 to mate with an outer flange 62 of the rear member 26, there being a ring 64 of a rigid sound absorbing material such as compressed paper along the interface between the flanges 60 and 62 for positioning the rear member 26 along the axis of the case 48. The flange 60 opposes the forces of hydrostatic pressure on the front face of the front member 24 thereby retaining the front and rear members 22 and 24 and the transducer unit 22 in their positions within the case 48.

As is well known, the capacitance of transducers such as the capacitance introduced between electrode 40 separated by the transducer elements 38, is tuned with an inductor to provide the desired electrical band pass characteristic of the transducer. In situations where a plurality of transducer elements are utilized in forming a single transducer unit, one or more inductors may be utilized in a series, parallel, or series-parallel coupling arrangement with the electrodes of the transducer unit.

In accordance with the invention, the transducer assembly 20 is provided with regions within the front and rear members 24 and 26 and the transducer unit 22 for housing the aforementioned inductors. By way of example, the FIGURE shows three locations where such inductors may be positioned. The FIGURE demonstrates the use of the inductor 46, held within the support element 44, an inductor 66 held within a void in the back face of the front 0 element 24, and a third inductor 68 of larger size than the inductors 46 and 66, the inductor 68 being positioned within a void of the rear member 26. The inductors 46, 66 and 68 are shown coupled by the electric wires 36 to the electrodes 40 in a series-parallel configuration in which the inductors 46 and 66 are wired in series with the electrodes 40 while the inductor 68 is shown wired in parallel to the electrodes 40. A passageway 70 is provided in the rear member 26 and an aperture 72 is provided in the cap 50 whereby the wires 36 are passed from the transducer unit 22 to a source of energization or a receiver (not shown) external to the transducer assembly 22. A grommet 74 is secured within the aperture 72 and to the wires 36 to prevent the entry of water into the transducer assembly 20.

Each of the inductors 46, 66 and 68 comprise cores 76, further identified by the legends A. B and C to identify the cores 76 of respectively the inductors 46, 66 and 68, windings 78, further identified by the legends A, B and C for respectively the inductors 46, 66 and 68, and an encapsulation 80 of a rigid insulation material such as polyurethane, further identified by the legends A, B and C respectively in the inductors 46, 66 and 68. The inductors 46, 66 and 68 are each fabricated in the form of a toroid so that their respective magnetic fields are essentially unaffected by the presence of the rod 28 which passes through each of the inductors 46, 66 and 68. The inductor 66 is secured within the front member 24 by a cap 82 which is threadedly secured to the front member 24, the cap 82 having an aperture 84 for passage of the wires 36. The inductor 46 is secured to the support element 44 by a ring 86 threadedly secured to the support element 44. The inductor 68 is secured to the rear member 26 by means of a cap 88 which is threadedly secured to the rear member 26 and has an aperture 90 for passage of the wires 36.

The core 76 in each of the inductors is fabricated of a heavy magnetic material such as iron and the windings 78 are fabricated from a heavy electrically conducting metal such as copper. The mass of the core 76C plus that of the winding 78C approximates the total mass of the material, typically iron, which was removed from the rear member 26 to provide the void wherein is nested the inductor 68. As shown in the FIGURE, the volume of the inductor 68 is approximately one-quarter the volume of the rear member 26. Still larger inductors having the same form as the inductor 68 may be utilized so that the mass of the inductor 68 may well be a major portion of the total mass of the rear member 26. Similar comments apply to the relative masses of the inductor 66 and the front member 24. In the event that the front and rear members 24 and 26 are fabricated from a lighter material such as an aluminum alloy, then the masses of the inductors 66 and 68 may well be more than half the total mass of the front and rear members 24 and 26, respectively. In many transducers, the mechanical design is adjusted to provide for a node of vibration at or near the center of the transducer unit such as the transducer unit 22 and, accordingly, an inductor such as the inductor 46 may be mounted near the node of vibration where its mass does not materially influence the mechanical vibration characteristic of the transducer assembly 20 because of the nodal or near nodal placement of the inductor.

Thus, it is seen that the inertia or mass of the inductors, such as the inductor 68, serves to mechanically tune the transducer assembly 20 while its electrical inductance serves to tune the electrical characteristic of the transducer assembly 20.

A feature in the construction of the transducer assembly 20 is a utilization of the electrical resistivity of the rubber ring 58, of the compressed paper ring 64 and the insulators 42 to prevent the circulation of an electric current in response to an electric field induced by variations in the magnitudes of currents in the windings 78. In the absence of the aforementioned electrical resistivity, an electrically conducting path is provided for the circulation of the electric current by the rod 28, the front member 24, the rear member 26 and either the transducer unit 22 or the case 48. Th windings 78 in cooperation with such an electrically conducting path provide an electromagnetic system in the form of a step-down transformer in which the electrically conducting path serves as a shorted, single turn secondary winding with an attendant extraction and dissipation of power from the windings 78, each of which may serve as the primary winding. The rings 58 and 64 and the insulators 42 insure that no such electrically conducting path exists in the transducer assembly 20, and that, accordingly, there is no attendant extraction and dissipation of power from the windings 78.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A sonar transducer comprising:

a transducer unit;

a front member and a rear member positioned at opposite ends of said transducer unit;

means for rigidly supporting said front member and said rear member and said transducer unit in mechanical contact with each other to provide a mechanically resonant system;

an inductor having inductance for tuning the capacitance of said transducer unit;

means for rigidly mounting said inductor to one of said members, the mass of said inductor plus the mass of said member to which said inductor is mounted being selected to provide a desired resonance frequency through a mechanical resonance, said member to which said inductor is mounted having a void, said inductor being nested in said void; and wherein said inductor has the form of a toroid.

2. A transducer according to claim 1 wherein said toroidal inductor has an axis coinciding with an axis of said transducer, and wherein said supporting means comprises rod means positioned along said axis and passing through such toroidal inductor for urging together said front member and said rear member.

3. A sonar transducer according to claim 1 wherein the mass of said inductor approximates the mass of a quantity of material of the member having said void, said quantity of material having a volume equal to the volume of said void.

4. A sonar transducer according to claim 1 wherein said mechanical contact is provided via an electrical insulator to prevent the dissipation of power via an induced current passing through said supporting means.

* * * * *